United States Patent Office 3,372,137
Patented Mar. 5, 1968

3,372,137
PROCESS FOR PREPARING MINERAL REIN-
FORCED POLYLACTAM COMPOSITIONS
Paul A. Tierney, St. Louis, Mo., assignor to Monsanto
Company, St. Louis, Mo., a corporation of Delaware
No Drawing. Filed June 3, 1964, Ser. No. 372,398
21 Claims. (Cl. 260—37)

This invention relates to a method for preparing polylactam compositions. In one major aspect, this invention relates to a method for treating inorganic material present in a monomer system in such a manner that the inorganic material does not deactivate the catalyst system even upon prolonged contact therewith.

Reinforced polylactam compositions and their methods of preparation are discussed in copending U.S. patent application Ser. No. 284,375, filed May 31, 1963. In that patent application, minimum polymerization times were not emphasized. In fact, a combination polymerization-curing time of one hour was usually employed to insure complete polymerization and cure. However, economical production of reinforced polylactam castings has made it necessary to reduce the total polymerization and cure time to less than five minutes.

In the conversion of the above-described reinforced polylactam casting process to a larger-scale system, considerable flexibility of operation has been acquired by the selective compounding of the various reactants into two pre-mixed slurry streams. Each of the slurry streams contains specified proportions of lactam, inorganic reinforcement, coupling agent, pigment, mold release agent, dispersant, etc. Into one slurry, only the basic polymerization catalyst is incorporated; into the second slurry, only the anionic polymerization initiator is added. Compounding of the reactants in this manner and keeping the two slurry streams separate has permitted large quantities of material to be mixed and stored at or near polymerization temperatures while eliminating the necessity for immediate casting. As long as the catalyst and initiator do not contact each other in the presence of the lactam monomer, polymerization is prevented. Upon mixing and casting the slurries, polymerized products have been prepared having mechanical properties comparable in all respects to products prepared from monomer slurries cast immediately after compounding. At least one major difficulty has arisen, however. Products prepared from premixed slurries have required unusually long times for complete polymerization by comparison to premixed monomer slurries containing no inorganic reinforcement and by comparison to monomer-mineral slurries which are cast shortly after mixing together. As an example, premixed slurries which are held at temperatures of about 150° C. for three hours before final mixing require polymerization times approximately ten times longer than is required if the monomer-mineral-catalyst-initiator system is cast immediately after mixing.

It is a primary object of this invention to provide a method for preparing polylactam compositions. It is another object of this invention to provide a method for treating inorganic material prior to its incorporation into a polylactam composition. It is a further object of this invention to provide a method for the rapid polymerization of filled polylactam compositions. It is yet an additional object to provide a method for the rapid polymerization of reinforced polylactam compositions. Additional objects, benefits, and advantages will become apparent as the detailed description of the invention proceeds.

I have discovered a process for preparing both filled polylactam compositions and reinforced polylactam compositions which comprises mixing lactam monomer preferably in the molten state, basic lactam polymerization catalyst, lactam polymerization initiator, optionally a coupling agent, and heat-pretreated inorganic material, and heating the mixture formed thereby at a temperature from about the melting point of said lactam up to about 250° C. for a time sufficient to cause polymerization.

Monomeric lactams which can be used in the practice of this invention are compounds of the formula

where R is an alklyene radical having from 3 to 12 or more carbon atoms. Examples include α-pyrrolidone, piperidone, γ-butyrolactam, δ-valerolactam, ε-caprolactam, caprolactams other than the ε-isomer, methylcyclohexanone isoximes, enantholactam, caprylolactam, nonanolactam, capryllactam, dodecanolactam, and cyclododecanone isoxime.

Basic lactam polymerization catalysts are any of the metals in metallic, complex ion, or compound form, which are capable of forming acids in the "Lewis acid" sense sufficiently strong to form an iminium salt of the lactam being polymerized. The iminium salt is the active catalyst of the present base-catalyzed polymerization system. Common examples of such catalysts are the alkali and alkaline earth metals such as sodium, potassium, lithium, calcium, strontium, barium, magnesium, etc., either in metallic form or in the form of hydrides, borohydrides, oxides, hydroxides and carbonates. In the case of compounds such as the hydroxides and carbonates which give off water when reacted with lactams, the bulk of such water must be removed from the polymerization system before the base-catalyzed polymerization can take place. If the water is not removed, the required iminium ion is not stable and hydrolytic polymerization will take place rather than base-catalyzed polymerization. Other effective catalysts are the organo metallic derivatives of the foregoing metals as well as of other metals. Examples of such organo metallic compounds are the lithium, potassium and sodium alkyls, such as butyl lithium, ethyl potassium or propyl sodium, or the aryl compounds of such metals such as sodium phenyl. Other suitable organo metallic compounds are diphenyl magnesium, zinc diethyl, triisopropyl aluminum, and diisobutyl aluminum hydride. As a general class, materials known as Grignard reagents are effective catalysts for the present polymerization. Typical Grignard catalysts include ethylmagnesium bromide, methylmagnesium chloride, phenylmagnesium bromide. Other suitable catalysts are sodium amide, magnesium amide and magnesium anilide.

The present polymerization of lactams is generally carried out with a catalyst concentration ranging anywhere from a small fraction of 1%, e.g. 0.01%, to as much as 15 or 20 mole percent, based upon the quantity of monomer to be polymerized. In general, however, preferred catalyst concentrations will fall between about 0.1 mole percent and about 1% of lactam monomer.

Lactam polymerization initiators (promoters) useful herein are as described in U.S. 3,017,391, U.S. 3,017,392, and U.S. 3,018,273. Particularly preferred are the isocyanate compounds set forth in U.S. 3,028,369.

The concentration of the promoter should be between about 0.1 mole percent to about 5 mole percent based upon the lactam being polymerized. The most effective concentration range lies between about 0.5 mole percent and about 2 mole percent of the lactam, although concentrations outside these ranges can also be used in certain circumstances such as is the synthesis of an unusually low molecular weight polymer.

Coupling agents capable of bonding an inorganic material to the polylactam are polyfunctional compounds having at least one group capable of reaction with the monomer during polymerization and at least one group capable of reaction with the inorganic material. Preferred coupling agents are compounds of the formula

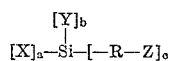

where X is an inorganic-reactive group, Y is a non-reactive group, Z is a lactam-reactive group, R is an alkylene or alkenylene chain of from 2 to about 20 carbon atoms, $a$ is an integer from 1 to 3, $b$ is an integer from 0 to 2, and $c$ is an integer from 1 to 3, provided that the sum of $a+b+c$ equals 4. Examples of X in the above formula include halogen, hydroxy, and alkoxy groups having from 1 to 6 carbon atoms; suitable examples for Y are hydrogen and the hydrocarbyl radicals which are reactive with neither the surface of the inorganic material nor with the polymerizing monomer; examples of Z include alkoxycarbonyl, primary and secondary amino, secondary amido, epoxy, isocyanato, and hydroxy groups. Illustrative compounds include the following:
3-aminopropyltriethoxysilane, $(C_2H_5O)_3SiC_3H_6NH_2$;
ethyl 11-triethoxysilylundecanoate,
$(C_2H_5O)_3SiC_{10}H_{20}COOC_2H_5$;
4-aminobutylmethyldichlorosilane, $(Cl)_2CH_3SiC_4H_8NH_2$;
methyl 3-methyldifluorosilylacrylate,
$(F)_2CH_3SiCH=CHCOOCH_3$;
3,4-epoxybutyltri-n-butoxysilane

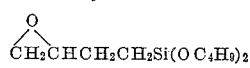

N-(β-aminoethyl)-3-aminopropyltrimethoxysilane,
$NH_2CH_2CH_2NHC_3H_6Si(OCH_3)_3$;
10-trihydroxydecyl tribromosilane, $HOC_{10}H_{20}Si(Br)_3$;
18-triiodosilylstearyl isocyanate, $OCHC_{18}H_{36}Si(I)_3$; and
3-carbamoylpropyltriethoxysilane,
$NH_2C(O)C_3H_6Si(OC_2H_5)_3$.

Another class of coupling agents are the phosphorus-based coupling agents of the formula

where R is an inorganic-reactive group equivalent to the X group of the silane compounds, R' is the lactam-reactive group equivalent to the Z group of the silane compounds, and R" is either a non-reactive group equivalent to the Y groups of the silane compound or is equivalent to the R or R' group of the instant compounds. Illustrative compounds include:
diethyl ethylundecanatophosphonate,
$(C_2H_5)_2P(O)C_{10}H_{20}COOC_2H_5$;
methylphosphonamidic chloride, $CH_3P(O)ClNH_2$;
phosphorisocyanatidodichloridic acid, $(Cl)_2P(O)NCO$;
dimethyl(2,3-epoxypropyl)phosphonate,

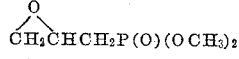

dicarbethoxyphosphinic acid, $(C_2H_5OOC)_2P(O)OH$;
sodium phosphorodiamidate, $(HN_2)_2P(O)(ONa)$;
dimethyl ureidophosphoric acid,
$(CH_3O)_2P(O)NHC(O)NH_2$; and
diethyl γ-aminopropylphosphonate,
$(C_2H_5O)_2P(O)C_3H_6NH_2$.

Additional compounds suitable for use herein will become obvious upon reference to copending U.S. patent application Ser. No. 333,630, filed Dec. 26, 1963.

Other compounds useful as couplers include primary and secondary amino, secondary amido, epoxy, isocyanato, hydroxy and alkoxycarbonyl-containing Werner complexes such as ε-amino caproatochromic chloride, isocyanatochromic chloride, resorcylatochromic chloride, crotonatochromic chloride, sorbatochromic chloride, and 3,4-epoxybutylchromic chloride.

Several methods of attaching the coupler to both the polymer chain and the inorganic material are suitable. The coupler and inorganic material can be mixed together separately or in the presence of a solvent such as water, alcohol, benzene, dioxane, or molten lactam, thereby effecting a coupler-inorganic bond. The treated inorganic material can then be dried and stored for future use, or used immediately in conjunction with a catalyzed monomeric lactam system. Alternatively, molten lactam, coupler, inorganic material, dispersing agents, mold release agent, initiator and finally catalyst can all be mixed together and polymerized in situ. A third method comprises polymerizing a lactam in the presence of a coupler but in the absence of inorganic material. This produces a polymer with appended inorganic-reactive groups. The modified polymer can then be subsequently reacted with the inorganic material to provide the desired inorganic-coupler-polymer bond.

The amount of coupler with which the inorganic material can be treated is relatively small. As little as one gram of coupling agent per 1000 grams of inorganic material produces a reinforced polymer with mechanical properties superior to those of a polymeric composition containing an untreated filler. If the inorganic material is to be chemically bound to the polymer through a coupling agent, it shall hereafter be referred to as a reinforcing agent; if merely added to the polymer without the formation of chemical bonds between the polymer and inorganic material, the inorganic material shall be referred to as a filler. By analogy, reinforced polylactam compositions are those compositions wherein the inorganic is chemically bonded to the polymer through a coupling agent; filled polylactam compositions are those compositions wherein the inorganic is merely physically mixed throughout the polylactam matrix.

Generally, quantities of coupler in the range of 3 to 20 grams per 1000 grams of inorganic material have been found most satisfactory although quantities in excess of that range can also be used with no detriment to the properties of the finished product.

The inorganic material can be selected from a wide variety of substances such as minerals, metals, metal oxides, metal salts such as metal aluminates and metal silicates, other siliceous materials such as glass fibers and quartz, clays, and mixtures thereof. Generally, if the inorganic material is to be used as a reinforcing agent, those inorganics which form an alkaline surface upon treatment with a base are preferred. Since metal silicates and siliceous materials readily acquire the desired alkaline surface, a preferred mineral mixture for use in this invention is one which contains a major amount, i.e. more than 50% by weight, of metal silicates or other siliceous materials. Examples of suitable reinforcing agents and fillers are feldspar, wollastonite, mullite, kyanite, chrysotile, crocidolite, fibrous aluminum silicate, $Al_2SiO_5$, spodumene, mica, montmorillonite, kaolinite, bentonite, hectorite, beidellite, attapulgite, chrysolite, garnet, saponite, hercynite, quartz, silica gel, glass fibers, cristobalite, metals such as aluminum, tin, lead, magnesium, calcium, strontium, barium, titanium, zirconium, vanadiaum, chromium, manganese, iron, cobalt, nickel, copper, and zinc, metal oxides such as oxides of the foregoing metals, and metal salts such as heavy metal phosphates, sulfides, and sulfates.

The term "inorganic material" or simply "inorganic" used in this disclosure refers to materials such as exemplified above. Preferably, the inorganic material has a somewhat refractory nature and a hardness of at least 4 as measured on the Moh Scale of Hardness. More preferably, the inorganic is a siliceous mineral having a three-dimensional silicate crystal lattice rather than a linear silicate lattice.

The amount of reinforcing agent or filler to be used in the preparation of the polymeric compositions varies over a very wide range with the maximum content being limited by several interrelated features. One limitation is the viscosity of the unpolymerized monomer-inorganic mixtures, i.e. too high an inorganic concentration produces mixtures too viscous to cast or mold. This limitation on inorganic concentration imposed by viscosity is in turn dependent to some extent upon the shape of the inorganic. That is, spherical particles do not increase the viscosity of the monomer mixture as much as fibrous material. By adjusting this property of a reinforcing agent and thereby controlling the viscosity of the monomer mixture, it is possible to prepare improved castable polymeric compositions containing a very large amount of reinforcing agent. Generally, less particulate filler than reinforcing agent can be used in a polymeric composition. This is because a filler in a polymer is not a component comparable to the polymer in load-bearing characteristics. Rather the polymeric constituent is primarily determinative of the tensile and flexural strengths and moduli of the composition. Therefore a very large amount of filler in a polymeric composition, when not treated with a coupler to convert it to a reinforcing agent, results in mechanically weak and brittle compositions. If on the other hand, the filler is fibrous in nature, then the upper limit of filler is established not by the degree of loss of mechanical properties of the composition, since mechanical properties will be often increased, but rather by the increased viscosity of the monomer-filler slurry.

Another factor which has an effect upon the upper limit of inorganic concentration is the particle size distribution of the mineral. A wide distribution of particle sizes provides a composition with a small amount of voids or spaces between the particles, thereby requiring less polymer to fill these spaces and bind the particles together. Regarding particle size, generally particles which pass through a 60 mesh screen are small enough to be used in the compositions of this invention, although particles as large as $1000\mu$ (18 mesh) can be used with equal or nearly equal success; regarding the lower limit on particle size, particles as small as $0.5\mu$ have been successfully employed and particles in the range of 200 to 400 m$\mu$ can also be used. More descriptive of suitable inorganic particles than limits on particle size is a specification of particle size distribution. A suitable wide particle size distribution is as follows:

| | Percent |
|---|---|
| $250\mu$ or less (60 mesh) | 100 |
| $149\mu$ or less (100 mesh) | 90 |
| $44\mu$ or less (325 mesh) | 50 |
| $5\mu$ or less | 10 |

A narrower distribution also suitable for use in this invention is:

| | Percent |
|---|---|
| $62\mu$ or less (230 mesh) | 100 |
| $44\mu$ or less (325 mesh) | 90 |
| $11\mu$ or less | 50 |
| $8\mu$ or less | 10 |

A relatively coarse mixture useful in this invention has the following particle size distribution:

| | Percent |
|---|---|
| $250\mu$ or less (60 mesh) | 100 |
| $149\mu$ or less (100 mesh) | 90 |
| $105\mu$ or less (140 mesh) | 50 |
| $44\mu$ or less (325 mesh) | 10 |

A suitable finely divided mixture has the following particle size distribution:

| | Percent |
|---|---|
| $44\mu$ or less (325 mesh) | 100 |
| $10\mu$ or less | 90 |
| $2\mu$ or less | 50 |
| $0.5\mu$ or less | 10 |

These figures regarding particle size distribution should not be construed as limiting since both wider and narrower ranges of distribution will also be useful as well as both coarser and finer compositions. Rather these figures are intended as representative illustrations of inorganic compositions suitable for use in the reinforced and in the filled polymeric compositions of this invention.

The most common fibrous reinforcing agent used is fibrous glass particles. These fibers are most easily incorporated into the polymeric composition when chopped into strands approximately 0.1 to 3 inches in length, and then either added to a prepolymer-coupler mixture as discrete particles or formed into a mat upon which the prepolymer is poured prior to polymerization. Such methods of incorporation of glass fibers are well known in the art and are mentioned here to demonstrate that decreased casting times can also be achieved by heat treating the fibrous glass particles prior to their incorporation into a monomeric lactam slurry.

Depending upon the factors described above, the concentration of granular inorganic material in the finished polylactam composition can range up to as much as 95% by weight. Theoretically there is no lower limit on the concentration of inorganic, but no appreciable benefit from improved properties or reduced cost is realized at concentrations below 5% by weight. A preferred range of reinforcing agent concentration is from about 50% to about 90% by weight; a preferred range of filler concentration is significantly lower in the range of 40% to 65% by weight although this preferred range is subject to wide variation depending upon the specific inorganic selected. As previously pointed out, the ranges of inorganic concentration are lower when fibrous material is used instead of granular material.

When premixed monomer-inorganic slurries are prepared in advance of the casting or molding step and stored at or near polymerization temperatures by keeping the catalyst and initiator separate, rapid polymerization of the monomer system can be achieved by pretreatment of the inorganic prior to its incorporation into the slurries. Pretreatment which we have found successful consists of heating the material at elevated temperatures for a period of time sufficient to effect the necessary changes in the inorganic material. Exactly what changes are effected has not been determined, but it is theorized that, prior to pretreatment, hydroxyl groups are present on the surface of inorganic materials. If present, these hydroxyl groups could deactivate the lactam polymerization catalyst upon prolonged contact therewith at elevated temperatures of 100° or 150° C. Pretreatment of the inorganic at elevated temperatures at or above about 400° C. removes these hydroxyl groups and thus is instrumental in providing rapid polymerization of premixed monomer-inorganic slurries. Regardless of any theoretical explanations to which I do not intend to be bound, heat pretreatment of that portion of inorganic material which comes into contact with the catalyst, and preferably heat pretreatment of all the inorganic used in the preparation of the polylactam composition, provides polymerization times significantly reduced by comparison to polymerizations where untreated inorganic is used. This reduction in polymerization time is achieved whether premixed slurries are used or whether all the components are mixed together and immediately cast or molded.

Minimum time and temperature requirements for effective pretreatment are interrelated. That is, the time requirement can vary considerably depending upon the temperature selected for treatment. Generally, temperatures substantially below 400° C., e.g. below about 375° C., are inadequate to achieve the benefits of my invention. Temperatures substantially in excess of 1200° C. are also unsuitable because such temperatures are capable of changing the composition of some inorganics, e.g. by volatilization of $SiO_2$, etc.; other compositions may be fused or converted to glasses. A preferred temperature range is from about 400° C. to about 1000° C. For temperatures within this range, a two hour exposure time is sufficient to achieve the benefits of this invention. Moreover, at the higher temperatures, the treatment time can be reduced considerably. For instance, heat treatment of inorganic material at 1000° C. for ten minutes is also satisfactory. A shortened time of ten minutes at 400° C. is unsatisfactory. Preferred heat treatment, then, consists of heating the inorganic to a temperature of from about 400° C. to about 1000° C. for about two hours or less, depending upon the particular temperature selected.

Lactam polymerizations can be carried out at temperatures ranging from about the lactam melting point up to about 250° C. Preferred temperatures vary, depending upon the particular lactam being polymerized, the degree of conversion desired, the time allotted for polymerization, the mechanical properties desired in the final product, and other factors. For the substantially complete polymerization of filled or reinforced ε-caprolactam in less than five minutes to produce a composition having high flexural strength and modulus, a preferred range for polymerization temperatures is from about 140° C. to about 200° C., and more preferably from about 150° C. to about 175° C.

The invention will be more clearly understood from the detailed description of the following specific examples.

Example 1

A quantity of 350 grams of ε-caprolactam is melted in a flask. To the molten caprolactam is added 680 grams of feldspar which has received no heat pretreatment. Also added to the caprolactam are 6.8 grams of 3-aminopropyltriethoxysilane and 3.5 grams of water. The mixture is heated to about 160° C. under vacuum to remove water and the alcohol formed by hydrolysis of the silane. The distillation is continued until 30 grams of caprolactam are also removed. The vacuum is released to a positive pressure of nitrogen and cooled to 110° or 120° C., at which time 12.3 ml. of a 3 molar solution of ethyl magnesium bromide in ethyl ether is added (equivalent to a catalyst concentration of 13 mmoles/mole of caprolactam). The slurry is then heated to 150° C. and 4.4 grams of toluene diisocyanate (TD-80) is added. The reaction mass is stirred until it gels; the time required in addition to gel time for complete set and cure is very short, e.g. less than a minute. Gel time is 22 minutes.

Example 2

The procedure described in Example 1 is followed except that 24.6 ml. of a 3 molar solution of ethyl magnesium inorganic in diethyl ether, equivalent to a catalyst concentration of 26 mmoles per mole of caprolactam, is employed. Gel time is ten minutes.

Example 3

The procedure described in Example 1 is followed except that 36.9 ml. of a 3 molar solution of ethyl magnesium bromide in diethyl ether, equivalent to a catalyst concentration of 39 mmoles per mole of caprolactam, is employed. Gel time is seven minutes.

Example 4

The procedure described in Example 1 is followed except that 0.68 gram of sodium hydride, equivalent to a catalyst concentration of ten mmoles per mole of caprolactam, is employed. Gel time is three minutes.

Example 5

A quantity of 350 grams of ε-caprolactam is melted in a flask. To the molten lactam, 680 grams of feldspar which has received no heat pretreatment is added. Also added to the mixture is 6.8 grams of 3-aminopropyltriethoxysilane and 3.5 grams of water. The mixture is heated to about 160° C. under vacuum to distill off excess water and the alcohol formed by hydrolysis of the silane. The distillation is continued until 30 grams of caprolactam is also removed. The vacuum is released to a positive pressure of nitrogen. The slurry is then divided into two equal portions and cooled to about 140° or 150° C. To one portion of the slurry, 0.68 gram of sodium hydride is added. To the second portion of slurry, 4.4 grams of toluene diisocyanate is added. The two slurries are maintained separately at 150° C. for three hours. Upon mixing together at 150° C., the mass gelled after 30 minutes.

Example 6

The procedure described in Example 4 is followed except that the feldspar was pretreated at 800° C. for one hour. Gel time was one minute.

Example 7

The procedure described in Example 5 was followed except that the feldspar was pretreated at 800° C. for one hour. Gel time was three minutes.

Table I is a summary of Examples 1 to 7 setting forth the variations for purposes of comparison.

TABLE I.—GELATION TIMES FOR FELDSPAR REINFORCED NYLON 6 [1]

| Example No. | Catalyst | Cat. conc (mmoles/mole caprolactam) | Feldspar Treatment | Hold Time (hrs.) | Gel Time (min.) |
|---|---|---|---|---|---|
| 1 | EtMgBr | 13 | None | 0 | 22 |
| 2 | EtMgBr | 26 | do | 0 | 10 |
| 3 | EtMgBr | 39 | do | 0 | 7 |
| 4 | NaH | 10 | do | 0 | 3 |
| 5 | NaH | 10 | do | 3 | 30 |
| 6 | NaH | 10 | 800° C | 0 | 1 |
| 7 | NaH | 10 | 800° C | 3 | 3 |

[1] 150° C; 9 mmoles of toluene diisocyanate per mole of caprolactam; volume fraction feldspar is 0.48.

Increasing the concentration of catalyst increases the rate of reaction as shown in Examples 1 through 3. The concentration of catalyst used in Example 3 is about 10 times the amount that would be required to give a comparable gel time in the absence of feldspar. Comparison of Examples 3 and 4 shows that sodium hydride was a more effective catalyst than ethyl magnesium bromide giving shorter gel times at only 25% of the concentration of the Grignard. Other work indicates that this order of activity is subject to variation depending upon the specific inorganics and initiators used. A comparson of Examples 4 and 5 shows that a considerable loss of catalyst activity occurs in only three hours at 150° C. Examples 6 and 7, respectively equivalent to Examples 4 and 5 in all respects except for the mineral pretreatment, shows that polymerization gel times can be significantly reduced by heat pretreatment of the mineral.

Example 8

A quantity of 350 grams of ε-caprolactam is melted in a flask to which is added 700 grams of mullite which has not been heat pretreated. To the mixture is also added 7.0 grams of 3-aminopropyltriethoxysilane and 3.5 grams of water. The mixture is heated to about 160° C. under vacuum to distill off excess water and alcohol formed by hydrolysis of the silane. The distillation is continued until 50 grams of caprolactam is also removed. The vacuum is released to a positive pressure of nitrogen and cooled to 110° C. or 120° C., at which time 11.5 ml. of a 3 molar solution of ethyl magnesium bromide in diethyl ether, equivalent to 13 mmoles/mole of caprolactam, is added. The slurry is then heated to 150° C. and 4.1 grams of toluene diisocyanate (TD–80) is added. The reaction mixture is stirred until it gels; gel time is 10.5 minutes.

Example 9

The procedure described in Example 8 is followed except that the mullite is heated at 800° C. for one hour prior to its incorporation into the monomer system. Gel time is 8.5 minutes.

Example 10

The procedure described in Example 8 is followed except that 0.64 gram of sodium hydride catalyst is used in place of the ethyl magnesium bromide. Gel time is 4.4 minutes.

Example 11

The procedure described in Example 9 is followed except that 0.64 gram of sodium hydride catalyst is used in place of the ethyl magnesium bromide. Gel time is 1.7 minutes.

Example 12

The procedure described in Example 8 is followed except that 10.9 grams of toluene diisocyanate is used instead of the 4.1 grams specified. Gel time is 27.5 minutes.

Table II is a summary of Examples 8 to 12 setting forth the variations therein for purposes of comparison.

TABLE II.—GELATION TIMES FOR MULLITE REINFORCED NYLON 6 [1]

| Example No. | Catalyst | Cat. conc. (mmoles/mole caprolactam) | Mullite Treatment | Gel Time (Minutes) |
|---|---|---|---|---|
| 8 | EtMgBr | 13 | None | 10.5 |
| 9 | EtMgBr | 13 | 800° C | 8.5 |
| 10 | NaH | 10 | None | 4.4 |
| 11 | NaH | 10 | 800° C | 1.7 |
| 12 | EtMgBr | 13 | None | [2] 27.5 |

[1] 150° C., 9 mmoles toluene diisocyanate per mole of caprolactam; volume fraction mullite is 0.48; no holding time.
[2] Contains 24 mmoles of toluene diisocyanate per mole of caprolactam.

Comparison of Examples 1 and 8 shows that mullite deactivates the Grignard catalyst considerably less than does feldspar; comparison of Examples 4 and 10 shows the reverse to be true but to a lesser extent, i.e. mullite deactivates the sodium hydride catalyst slightly more than does the feldspar. Although heat pretreatment of the mullite is only slightly effective in reducing gel time of the lactam system using a Grignard catalyst (Examples 8 and 9), the same heat pretreatment appreciably reduces gel time of a sodium hydride catalyzed lactam system (Examples 10 and 11). Example 12 shows that increasing initiator concentration slows down the polymerization.

Example 13

A quantity of 350 grams of ε-caprolactam is melted in a flask to which is added 670 grams of wollastonite which has not been heat pretreated. To this mixture is added 6.7 grams of 3-aminopropyltriethoxysilane and 3.5 ml. of water. The mixture is heated to about 160° C. to distill off excess water, alcohol formed by the hydrolysis of the silane, and 20 grams of caprolactam. The vacuum is released to a positive pressure of nitrogen and cooled to 110° or 120° C., at which time 12.6 ml. of a 3 molar solution of ethyl magnesium bromide in diethyl ether, equivalent to 13 mmoles of catalyst per mole of caprolactam is added. The slurry is heated to 150° C. and 4.6 grams of toluene diisocyanate is added and the slurry stirred until it gels; gel time is 39 minutes.

Example 14

The procedure described in Example 13 is followed except that the wollastonite is heated at 800° C. for one hour prior to its incorporation into the lactam system. Gel time is 34 minutes.

Example 15

The procedure described in Example 13 is followed except that the polymerization is conducted at 200° C. instead of 150° C. Gel time is seven minutes.

Example 16

The procedure described in Example 13 is followed except that 0.70 gram of sodium hydride catalyst is used instead of the Grignard. Gel time is 33 minutes.

Example 17

The procedure described in Example 14 is followed except that 0.70 gram of sodium hydride catalyst is used instead of the Grignard. Gel time is one minute.

Example 18

The procedure described in Example 17 is followed except that the wollastonite is exposed to the atmosphere at room temperature for one week after its heat-pretreatment but before its incorporation into the lactam system. Gel time is four minutes.

Table III is a summary of Examples 13 to 18 set forth in tabular form for purposes of comparison.

TABLE III.—GELATION TIMES FOR WOLLASTONITE REINFORCED NYLON 6 [1]

| Example No. | Catalyst | Cat. conc. (mmoles/mole caprolactam) | Polymerization Temperature, ° C. | Wollastonite Treatment | Gel Time (Min.) |
|---|---|---|---|---|---|
| 13 | EtMgBr | 13 | 150 | None | 39 |
| 14 | EtMgBr | 13 | 150 | 800° C | 34 |
| 15 | EtMgBr | 13 | 200 | None | 7 |
| 16 | NaH | 10 | 150 | do | 33 |
| 17 | NaH | 10 | 150 | 800° C | 1 |
| 18 | NaH | 10 | 150 | [2] 800° C | 4 |

[1] 9 mmoles toluene diisocyanate per mole of caprolactam; volume fraction of wollastonite is 0.42; no holding time.
[2] Wollastonite was exposed to atmosphere for 7 days subsequent to heat pretreatment.

As in the case of the mullite, heat treatment of wollastonite in a Grignard catalyzed lactam system had only a slight beneficial effect upon the rate of polymerization (Examples 13 and 14). Increasing the polymerization temperature was very effective in reducing gel times (Examples 13 and 15). Heat-pretreatment of wollastonite was also very effective in a sodium hydride catalyzed lactam system (Examples 16 and 17). Example 18 shows that only a part of the effectiveness of heat-pretreatment is lost if the inorganic is exposed to the air prior to use.

What is claimed is:

1. A process for preparing polylactam compositions comprising
    (a) combining lactam monomer, basic lactam polymerization catalyst, lactam polymerization initiator, and inorganic material heat-pretreated at temperatures above about 375° C. for a time sufficient to remove surface hydroxyl group; and
    (b) heating the mixture formed thereby at a temperature from about the melting point of said lactam up to about 250° C. for a time sufficient to cause polymerization.

2. A process according to claim 1 wherein said initiator is a polyfunctional isocyanate.

3. A process according to claim 1 wherein said initiator is toluene diisocyanate.

4. A process according to claim 1 wherein said inorganic material is a siliceous mineral.

5. A process according to claim 1 wherein said inorganic material is wollastonite.

6. A process according to claim 1 wherein said inorganic material is feldspar.

7. A process according to claim 1 wherein said inorganic material is mullite.

8. A process according to claim 1 wherein said lactam is ε-caprolactam.

9. A process according to claim 1 wherein said polymerization catalyst is sodium caprolactam.

10. A process according to claim 1 wherein said polymerization catalyst is bromo-magnesium caprolactam.

11. A process according to claim 1 wherein said polymerization is conducted at a temperature of about 140° C. to about 200° C.

12. A process according to claim 1 wherein said mixture is cast immediately after contact of the basic lactam polymerization catalyst with lactam polymerization initiator.

13. A process according to claim 20 wherein said coupling agent is 3-aminopropyltrialkoxysilane.

14. A process according to claim 20 wherein said coupling agent is alkyl 11-trialkoxysilylundecanoate.

15. A process for preparing reinforced polycaprolactam compositions comprising (a) combining molten ε-caprolactam, a siliceous mineral heat-pretreated at temperatures above about 375° C. for a time sufficient to remove surface hydroxyl groups, a coupling agent of the formula $$(RO)_3\!-\!Si\!-\!(CH_2)_n\!-\!Z$$

where R is an alkyl group having from 1 to 4 carbon atoms, Z is an amino group, and $n$ is an integer from 3 to about 20, a polyfunctional isocyanate, and a compound selected from the group consisting of sodium hydride and lower alkyl magnesium halides; and (b) heating the mixture formed thereby at a temperature from about 140° C. to about 200° C.

16. A process according to claim 15 wherein Z represents a carbalkoxy group.

17. A process for preparing polylactam compositions comprising
(a) preparing two molten lactam-inorganic slurries wherein said inorganic has been heat-pretreated at temperatures above about 375° C. for a time sufficient to remove surface hydroxyl groups,
(b) adding basic lactam polymerization catalysts to one slurry,
(c) adding lactam polymerization initiator to the second slurry,
(d) mixing the two slurries together, and
(e) heating the resulting mixture at a temperature from about the melting point of said lactam up to about 250° C. for a time sufficient to cause polymerization.

18. A process according to claim 17 wherein said polymerization is conducted at a temperature from about 140° C. to about 200° C.

19. A process according to claim 17 wherein the heat-pretreatment of said inorganic material comprises heating the inorganic mineral at a temperature from about 400° C. to about 1200° C.

20. A process for preparing reinforced polylactam compositions comprising
(a) combining lactam monomer, basic lactam polymerization catalyst, lactam polymerization initiator, coupling agent of the formula $$[X]_a\!-\!\underset{\underset{[Y]_b}{|}}{Si}\!-\![(CH_2)_n\!-\!Z]_c$$

where X is an inorganic-reactive group selected from the group consisting of halogen, hydroxy, and alkoxy radicals, Y is a non-reactive hydrocarbyl group, Z is a polymer-reactive group selected from the group consisting of amino, amido, carboxyl and carbalkoxy radicals, $n$ is an integer from 2 to about 20, $a$ is an integer from 1 to 3, $b$ is an integer from 0 to 2, $c$ is an integer from 1 to 3, provided that the sum of $a+b+c$ equals 4, and inorganic material heat-treated at temperatures above about 375° C. for a time sufficient to remove surface hydroxyl groups; and (b) heating the mixture formed thereby at a temperature from about the melting point of said lactam up to about 250° C. for a time sufficient to cause polymerization.

21. A process according to claim 1 wherein said heat-pretreated inorganic, if left exposed to atmospheric humidity, is placed in the presence of a polymerizing lactam within seven days of its heat-pretreatment.

References Cited

UNITED STATES PATENTS

| | | | |
|---|---|---|---|
| 2,205,722 | 6/1940 | Graves | 264—169 |
| 2,751,369 | 6/1956 | Te Grotenhius | 260—41 |
| 2,763,579 | 9/1956 | Biefeld | 117—72 |
| 2,805,214 | 9/1957 | Zimmerman | 260—78 |
| 3,028,369 | 4/1962 | Butler et al. | 260—78 |
| 3,121,768 | 2/1964 | Boyer | 260—78 |
| 3,148,026 | 9/1964 | Roderburg | 106—309 |
| 3,141,006 | 7/1964 | Kohan | 260—78 |
| 3,166,533 | 1/1965 | Wichterle et al. | 260—78 |
| 3,251,799 | 5/1966 | Pietrusza et al. | 260—78 |

FOREIGN PATENTS

| | | |
|---|---|---|
| 665,340 | 6/1963 | Canada. |
| 98,168 | 1/1961 | Czechoslovakia. |
| 97,333 | 11/1960 | Czechoslovakia. |

OTHER REFERENCES

O. Wichterle, J. Tomka and J. Sebenda, Collection Czechoslovi Chem. Comm., vol. 28, 1963, pages 696–99.

R. K. Iller, Colloid Chemistry of Silica and Silicates, Cornell U. Press, Ithaca, N.Y., 1955, pages 233–240.

B. M. Vanderbilt and J. J. Jaruzelski, Soc. Plas Indus. Proceedings, 17th Ann. Tech. Conf., 1962, pages 1–3.

MORRIS LIEBMAN, *Primary Examiner.*

ALEXANDER H. BRODMERKEL, *Examiner.*

J. E. CALLAGHAN, *Assistant Examiner.*

UNITED STATES PATENT OFFICE
CERTIFICATE OF CORRECTION

Patent No. 3,372,137                         March 5, 1968

Paul A. Tierney

It is certified that error appears in the above identified patent and that said Letters Patent are hereby corrected as shown below:

Column 3, lines 26 to 29, the formula should appear as shown below:

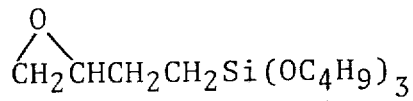

Signed and sealed this 7th day of October 1969.

(SEAL)
Attest:

Edward M. Fletcher, Jr.                  WILLIAM E. SCHUYLER, JR.
Attesting Officer                           Commissioner of Patents